US011574501B2

(12) United States Patent
Bolme et al.

(10) Patent No.: US 11,574,501 B2
(45) Date of Patent: Feb. 7, 2023

(54) RIFLE-LIKE CAMERA FOR LONG DISTANCE FACE RECOGNITION

(71) Applicant: UT-Battelle, LLC, Oak Ridge, TN (US)

(72) Inventors: David S. Bolme, Oak Ridge, TN (US); Hector J. Santos-Villalobos, Oak Ridge, TN (US); David C. Cornett, III, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 219 days.

(21) Appl. No.: 17/024,855

(22) Filed: Sep. 18, 2020

(65) Prior Publication Data

US 2021/0089758 A1     Mar. 25, 2021

Related U.S. Application Data

(60) Provisional application No. 62/903,095, filed on Sep. 20, 2019.

(51) Int. Cl.
| | |
|---|---|
| *G06V 40/16* | (2022.01) |
| *G03B 13/36* | (2021.01) |
| *G03B 17/12* | (2021.01) |
| *G03B 29/00* | (2021.01) |
| *G06T 7/194* | (2017.01) |
| *G03B 37/04* | (2021.01) |

(52) U.S. Cl.
CPC ........... *G06V 40/172* (2022.01); *G03B 13/36* (2013.01); *G03B 17/12* (2013.01); *G03B 29/00* (2013.01); *G03B 37/04* (2013.01); *G06T 7/194* (2017.01); *G03B 2217/002* (2013.01); *G06T 2207/20221* (2013.01); *G06T 2207/30201* (2013.01)

(58) Field of Classification Search
CPC ........... G06T 7/194; G06T 2207/20221; G06T 2207/30201; G03B 13/36; G03B 17/12; G03B 37/04; G03B 2217/002; G03B 29/00; G06V 40/172
See application file for complete search history.

(56) References Cited

U.S. PATENT DOCUMENTS

| | | | | |
|---|---|---|---|---|
| 6,000,163 | A * | 12/1999 | Gordon ................. | F41G 3/2611 95/12 |
| 8,564,668 | B2 * | 10/2013 | Plotsker ................. | G09G 5/391 89/41.17 |
| 10,750,431 | B2 * | 8/2020 | Juhasz .................. | H04W 4/029 |
| 2012/0240444 | A1 * | 9/2012 | Russell .................. | G03B 17/48 396/419 |

(Continued)

*Primary Examiner* — Clayton E. LaBalle
*Assistant Examiner* — Diana Hancock
(74) *Attorney, Agent, or Firm* — Warner Norcross + Judd LLP (57) ABSTRACT

An improved long-range facial recognition system is provided. The facial recognition system includes an integrated, rifle-like mounting platform with modular and interchangeable components, including a machine-vision camera, a facial recognition module, and an aiming scope. The mounting platform includes an elongated frame, a hand grip, a shoulder stock, and an underbody support attachment for an optional bipod. The mounting platform provides an intuitive, shoulder-operated support structure for stabilizing the machine-vision camera and reducing vibrations that otherwise inhibit long distance imaging.

20 Claims, 7 Drawing Sheets

(56) References Cited

U.S. PATENT DOCUMENTS

| | | | |
|---|---|---|---|
| 2019/0195586 A1* | 6/2019 | Milde, Jr. | F41C 33/029 |
| 2019/0376755 A1* | 12/2019 | Teetzel | F41A 17/066 |
| 2019/0376764 A1* | 12/2019 | Hammond | F41G 1/38 |
| 2020/0271408 A1* | 8/2020 | Dagan | F41A 17/06 |
| 2020/0272044 A1* | 8/2020 | Walker | F41G 11/003 |
| 2021/0142045 A1* | 5/2021 | Noest | G06V 40/168 |

* cited by examiner

RIFLE-LIKE CAMERA FOR LONG DISTANCE FACE RECOGNITION

CROSS-REFERENCE TO RELATED APPLICATIONS

This application claims the benefit of U.S. Provisional Application 62/903,095 filed Sep. 20, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to systems and methods for facial recognition, and in particular, the long-distance facial identification of human subjects.

BACKGROUND OF THE INVENTION

Facial recognition includes camera-based systems that are broadly classified as performing facial verification or facial identification. Facial verification includes the one-to-one comparison of a facial biometric signature with a known signature. Facial identification, by contrast, includes the one-to-many comparison of a facial biometric signature with many known signatures. An identity is reported in response to a potential match at a given confidence level.

In recent years, advances in image capture cameras and in biometric algorithms have resulted in facial identification systems that surpass human facial recognition performance. In addition, facial identification has several advantages over other forms of biometric identification. For example, facial identification can be performed at longer distances and in a covert manner, particularly when compared to fingerprint and iris scans.

In many end-user applications, the ability to transport, deploy, and operate facial identification systems on a portable platform is increasingly important. It is especially important that facial identification systems require minimal set-up and operator training. Existing facial identification systems include tri-pod based telephoto cameras and a separate laptop for face detection, face feature extraction, and face matching. However, these systems suffer from many drawbacks, including an extended set-up time and a heightened physical profile when deployed.

Accordingly, there remains a continued need for a portable platform for facial recognition, and in particular, the facial identification of human subjects over long distances.

SUMMARY OF THE INVENTION

An improved long-range facial recognition system is provided. The facial recognition system includes an integrated, rifle-like mounting platform with modular and interchangeable components, including a machine-vision camera, a long-focus lens, a facial recognition module, and an aiming scope. The mounting platform includes an elongated frame, a hand grip, a shoulder stock, and an underbody support attachment for an optional bipod. The mounting platform provides an intuitive, shoulder-operated support structure for stabilizing the machine-vision camera and reducing vibrations that otherwise inhibit long distance imaging.

In one embodiment, the long-range facial recognition system includes a machine-vision camera and a long-focus lens mounted to an elongated frame. The machine-vision camera is electronically coupled to a facial recognition module and is adapted to provide image frame data to the facial recognition module at a high frame rate. The facial recognition module is adapted to compute a biometric signature based on a two-dimensional image provided by the machine-vision camera and is adapted to compare the biometric signature with a plurality of known biometric signatures to determine a match. Identifying information relating to the match is presented on a heads-up-display that is integrated into an aiming scope, or in-line with an aiming scope, which is also secured to the elongated frame above the machine-vision camera.

In another embodiment, a method for long-range facial recognition is provided. The method includes receiving, from a machine-vision camera, image frame data including a facial image captured over a distance, and computing, at a facial recognition module, a biometric signature for the facial image, where the machine-vision camera and the facial recognition module are mounted to a portable, rifle-like mounting platform. The method further includes comparing, at the facial recognition module, the biometric signature with a plurality of known biometric signatures to determine a match. If a match is found, the method includes presenting identifying information on a heads-up-display integrated into an aiming scope or in-line with the aiming scope that is also secured to the rifle-like mounting platform.

The present invention provides an intuitive, adaptable, and lightweight design for rapid access without sacrificing optical performance and biometric processing. During preliminary evaluations, successful facial recognition was achieved at 400 m in harsh environmental conditions and 1.2 km in ideal environmental conditions. The present invention also provides advantages over facial identification systems that require tripods or gimbaled long range cameras, which require multiple components and are difficult to transport, set up, and operate.

These and other features and advantages of the present invention will become apparent from the following description of the invention, when viewed in accordance with the accompanying drawings and appended claims.

DETAILED DESCRIPTION OF THE CURRENT EMBODIMENTS

The current embodiments include a system for long-range facial recognition of human subjects in real-time and at distances of 100 meters to 1500 meters. The system generally includes a man-portable, shoulder-operated platform with modular components for facial identification, optionally without reliance on external data structures.

Figure 1:
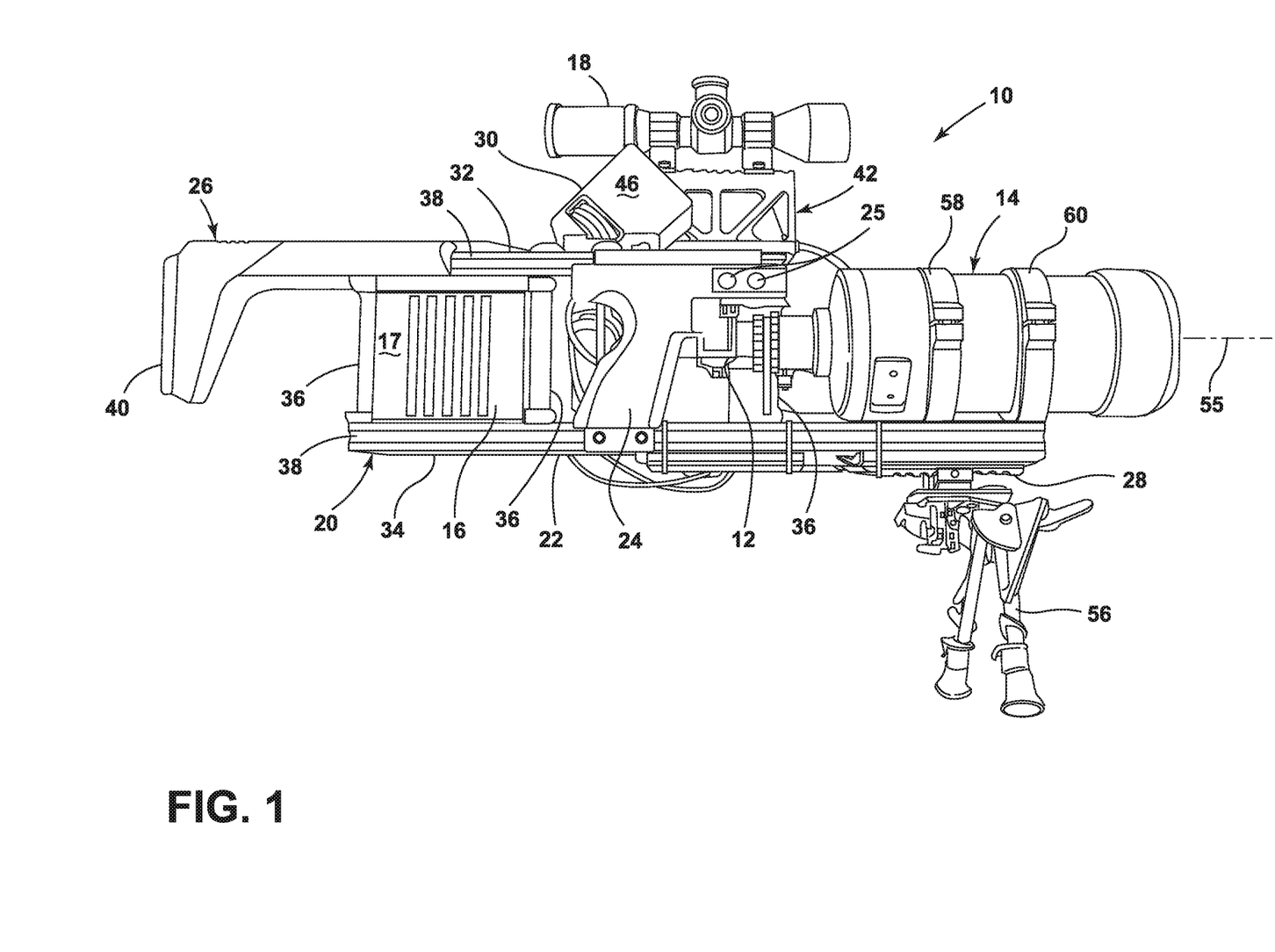
FIG. 1 is a side view of a long-range facial recognition system in accordance with a first embodiment.
Figure 2:
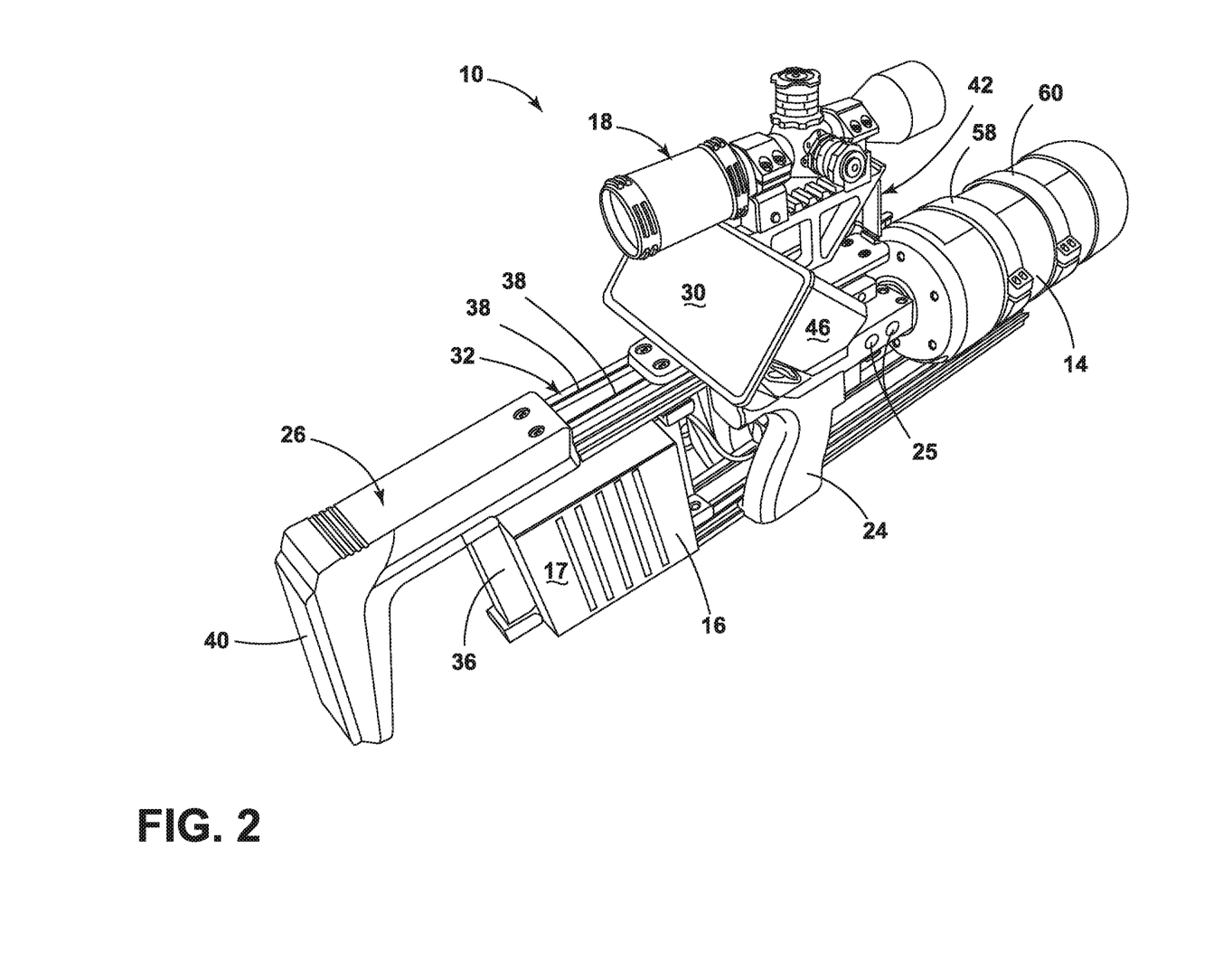
FIG. 2 is a perspective view of the long-range facial recognition system of FIG. 1.

Referring first to FIGS. 1-2, a facial recognition system in accordance with the present invention is illustrated and generally designated 10. The facial recognition system 10 includes a machine-vision camera 12, a long-focus lens 14, a facial recognition module 16, and an aiming scope 18, each being mounted to a portable mounting platform 20. The portable mounting platform 20 includes an elongated frame 22, a hand grip 24, a shoulder stock 26, and an underbody support attachment 28 for a tripod, a bipod, or a monopod. A touch screen display 30 is also mounted to the portable mounting platform 20, and a heads-up-display provides real-time identification information to the operator of the facial recognition system 10.

More particularly, the mounting platform 20 includes an elongated frame 22 having upper and lower mounting rails 32, 34. The upper and lower mounting rails 32, 34 extend parallel to each other and are separated by vertical spacers 36 to provide a rigid, box-like frame for the facial recognition system 20. The upper and lower mounting rails 32, 34 include a T-slot 38 extending down the centerline of the lateral sides of the mounting rails. Parallel T-slots 38 also extend along the upper surface and lower surface of the mounting rails 32, 34, visible in FIG. 2 for example. The upper and lower mounting rails 32, 34 include 2040 metric extruded aluminum beams in the current embodiment, but can be formed from other materials in other embodiments, including metals, polymers, and carbon fiber composites.

Figure 4:
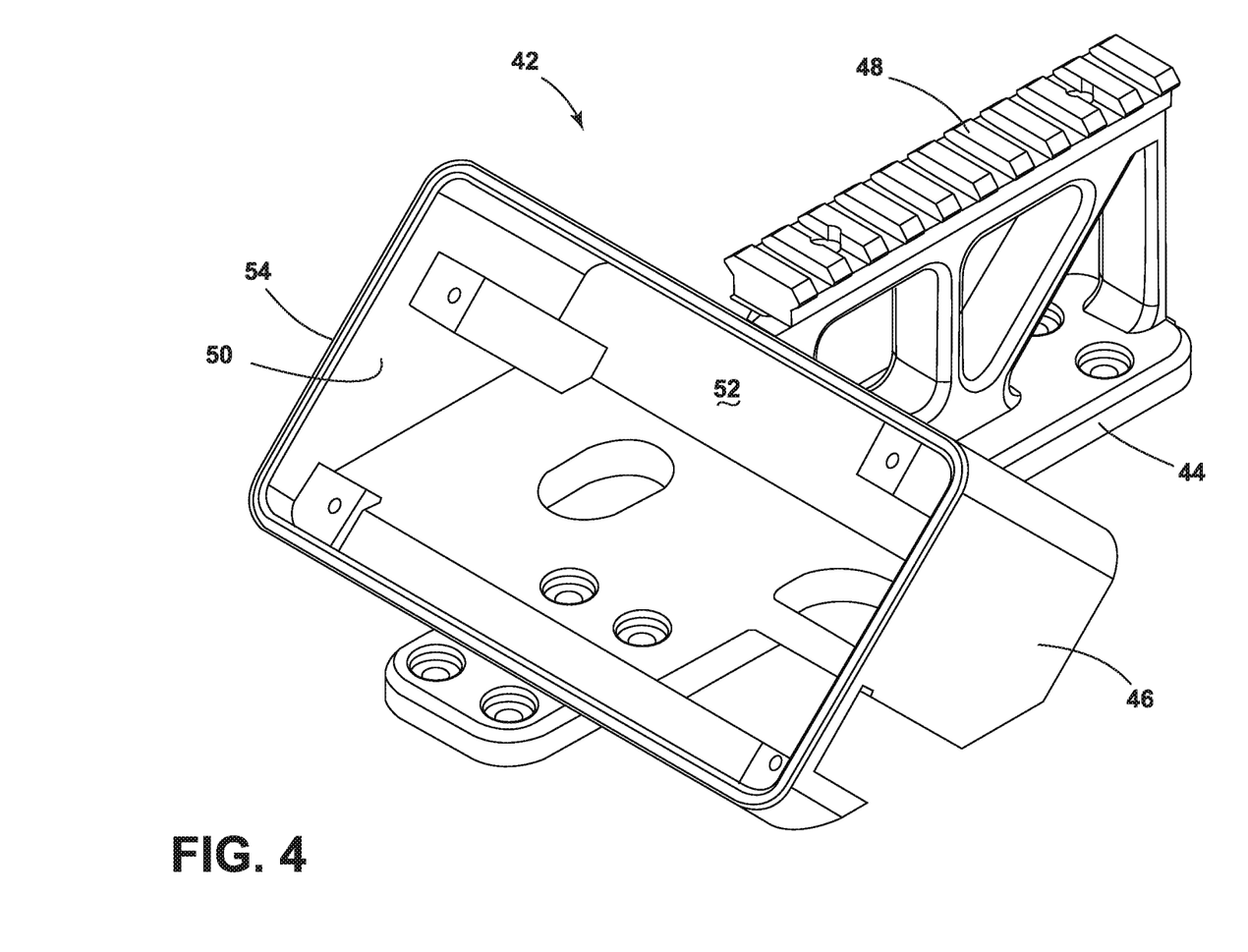
FIG. 4 is a perspective view of a touch screen and aiming scope mount for use with the long-range facial recognition system of FIGS. 1 and 3.

The shoulder stock 26 is secured to the upper mounting rail 32 and includes a butt-plate 40, the shoulder stock 26 being extendable in length. An attachment assembly 42 for the touch screen 30 and the aiming scope 18, shown in FIG. 4, can be secured to the upper mounting rail 32. The attachment assembly 42 includes a base plate 44, a rectangular housing 46 for the touch screen interface 30, and an upper mounting plate 48 for attachment to the aiming scope 18, optionally a telescopic scope. The aiming scope 18 is optional however, and in other embodiments the machine-vision camera video feed is presented on an aiming device (via an optical splitter) or the touch screen interface 30. The rectangular housing 46 for the touch screen interface 30 includes a rectangular sidewall 50 and a bottom wall 52 that is set back from a rectangular opening 54, the rectangular opening 54 being oriented at a non-zero angle relative to the optical axis 55 of the facial recognition system 10. The upper mounting plate 48 includes a mounting surface, for example a Picatinny or Weaver rail, and is supported above the base plate 44, such that the aiming scope 18 is supported above the touch screen interface 30.

Referring again to FIGS. 1-2, the facial recognition system 10 also includes an underbody support attachment 28 mounted to the lower mounting rail 34. The underbody support attachment 28 includes a mounting surface, optionally a Picatinny or Weaver rail for example, for attachment to a bipod 56 or other support. The hand grip 24 is illustrated as being a pistol grip and is mounted to the right side of the upper mounting rail 32 and the lower mounting rail 34, providing additional structural rigidity to the box-like elongated frame 22. One or more controls 25 are supported on the hand grip 24. By placing the hand grip 24 to the right of center, the optical package (machine-vision camera 12, long-focus lens 14) can be positioned through the center of the facial recognition system 10, which shortens its overall length.

Figure 3:
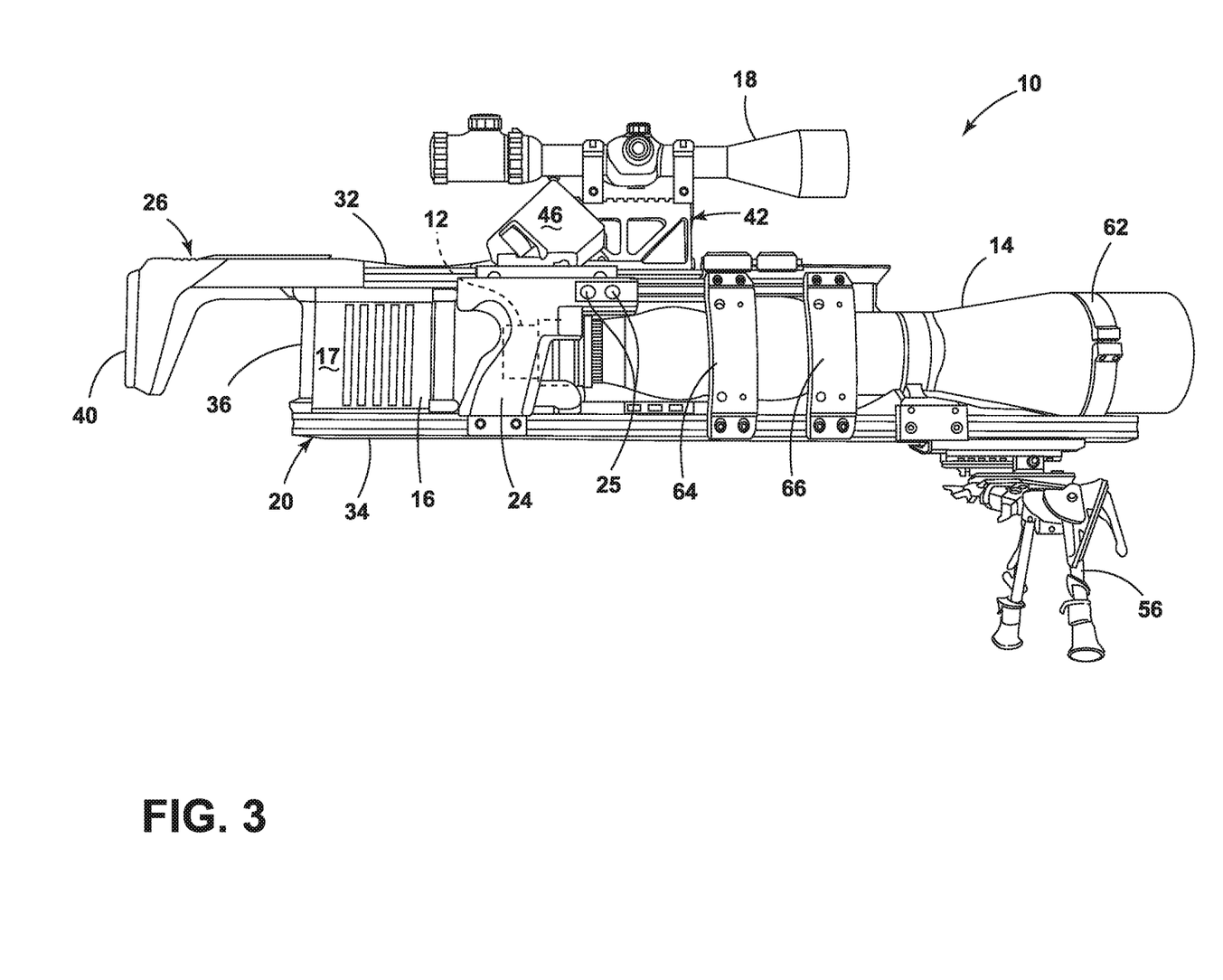
FIG. 3 is a side view of a long-range facial recognition system in accordance with a second embodiment.

The long-focus lens 14 is secured to the lower mounting rail 34 with first and second ring clamps 58, 60. The long-focus 14 lens is a telephoto lens in the current embodiment, whose optical output is coupled to the machine-vision camera 12. As alternatively shown in FIG. 3, the long-focus lens 14 is secured to upper and lower mounting rails 32, 34 with a ring clamp 62 and first and second side brackets 64, 66, the long-focus lens 14 of FIG. 3 having an increased focal length over the long-focus lens 14 of FIGS. 1-2. In each embodiment, the machine-vision camera 12 is adapted to output image data to the facial recognition module 16. The facial recognition module 16 is housed within an electronics bracket 17 behind the machine-vision camera 12 and between upper and lower mounting rails 32, 34. An on-board power supply, for example a rechargeable lithium-ion battery, provides electrical power to the machine-vision camera 12 and the facial recognition module 16.

The facial recognition module 16 is adapted to perform detection, extraction, and matching based on the output of the machine-vision camera 12. In particular, a detection sub-module includes computer readable memory with instructions that, when executed, causes the facial recognition module 16 to segment face areas from the image background for a given image frame. Facial components, such as the eyes, nose, mouth, and facial outline, are located within each image frame and in some instances tracked between successive image frames. An extraction sub-module includes computer readable memory with instructions that, when executed, causes the facial recognition module 16 to determine a biometric signature for the detected facial image. The biometric signature includes sufficient information, often in the form of a feature vector, to distinguish between faces of different persons despite variations in facial pose, facial expression, and illumination. Lastly, a matching sub-module includes computer readable memory with instructions that, when executed, causes the facial recognition module 16 to compare a biometric signature, for example the extracted feature vector, against known biometric signatures in a biometric watchlist, for example a watchlist of persons-of-interest. The matching sub-module outputs the identity of the person-of-interest when a match is determined with a predetermined confidence level. The facial recognition module 16 optionally includes an NVIDIA GPU ARM processor for running the open-source FaRO facial recognition algorithm, however other algorithms can be used as desired, including offerings from NEC, Idemea, or Rank One Inc., for example.

Figure 5:
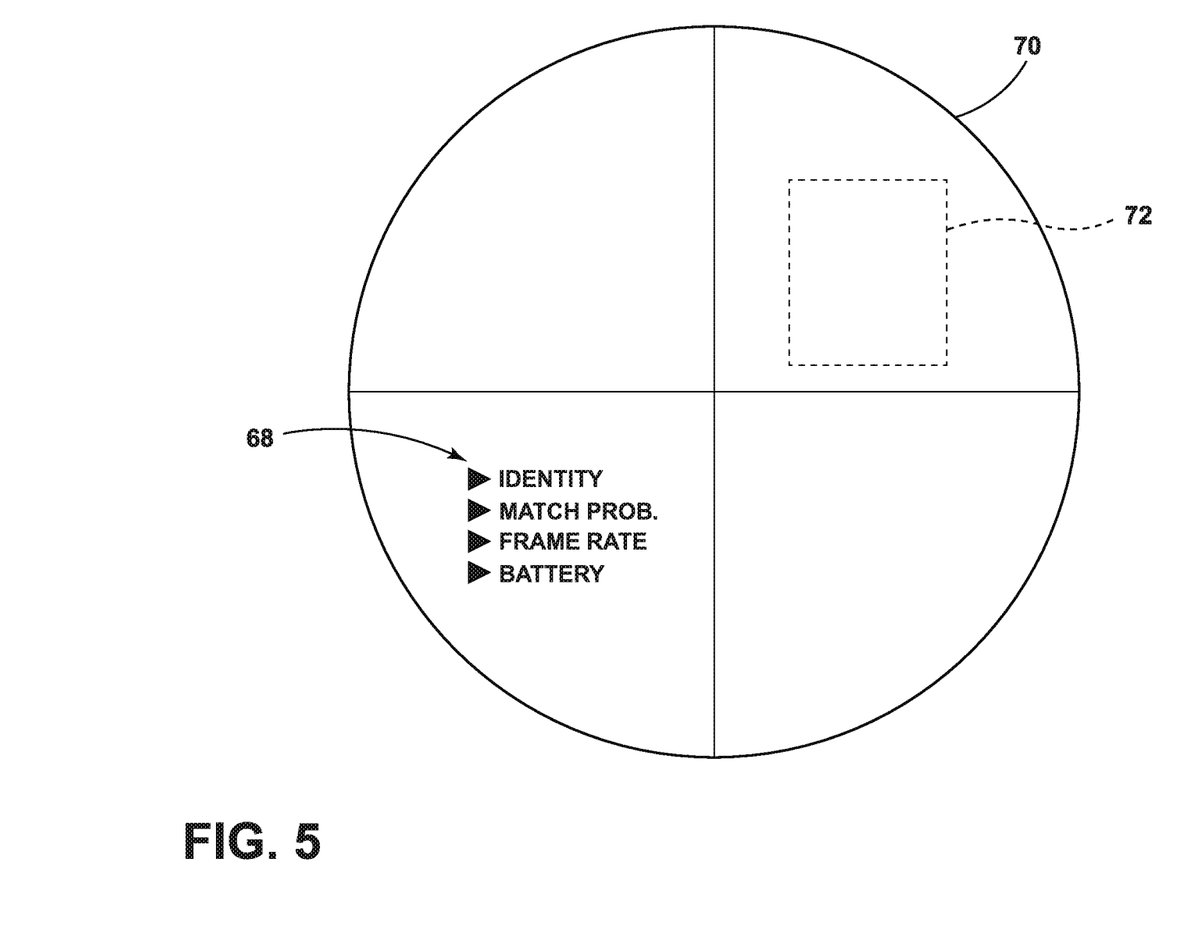
FIG. 5 illustrates a heads-up-display integrated into, or in-line with, an aiming scope for the long-range facial recognition system of FIGS. 1 and 3.
Figure 6:
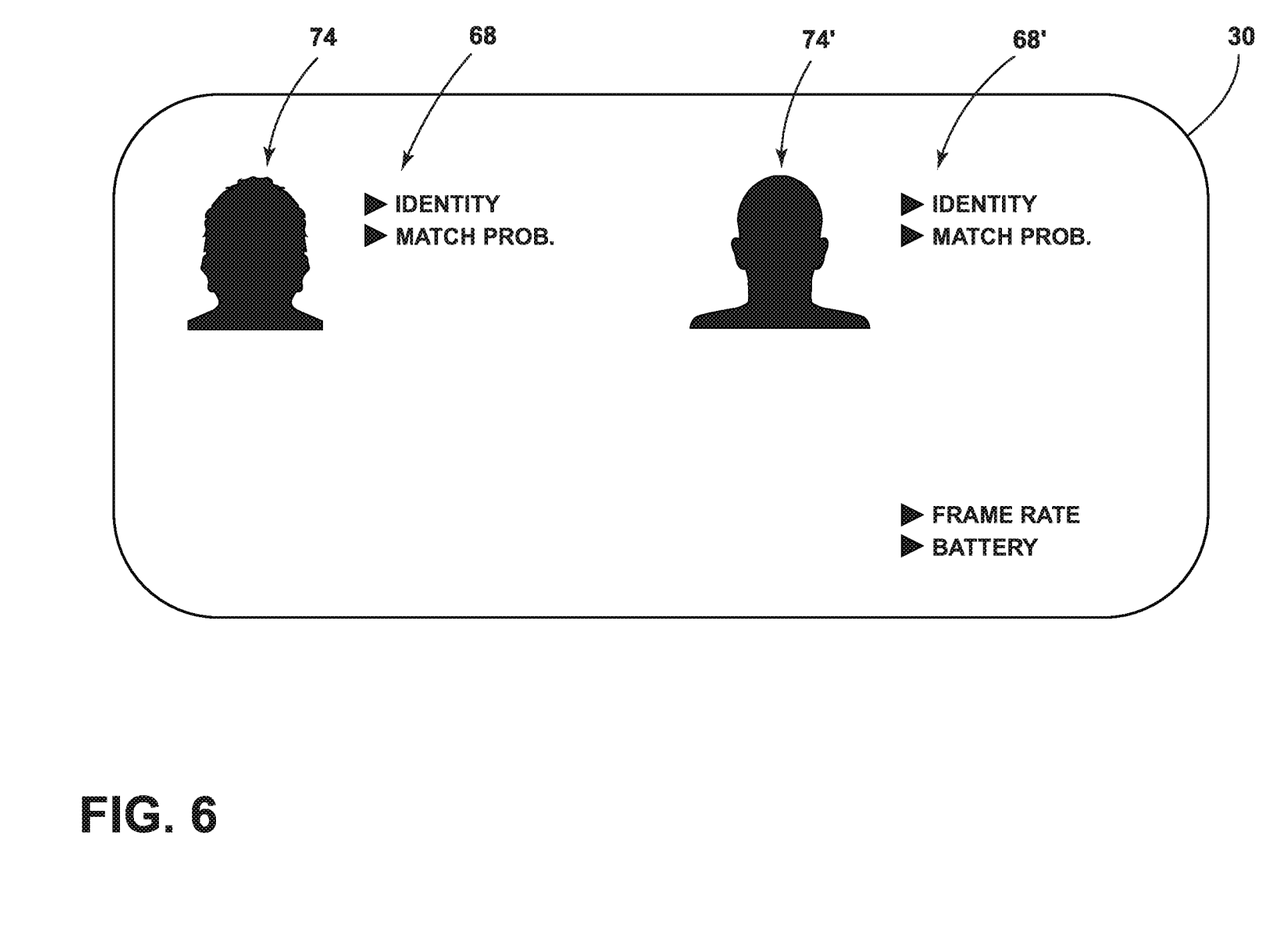
FIG. 6 illustrates identifying information and system information presented on a touch screen display for the long-range facial recognition system of FIGS. 1 and 3.

Identifying information pertaining to the person-of-interest is displayed for the operator in a number of formats. As shown in FIG. 5, the aiming scope 18 can present an LCD data field 68 that is superimposed over the aiming scope sight picture 70. The data field 68 includes the identity of the person of interest and a match confidence level. The data field 68 can also include system parameters, including for example the current frame rate being processed by the facial recognition module 16 and the remaining battery life. The aiming scope 18 can also superimpose a designator box 72 over the person-of-interest. The foregoing information is described as being superimposed directly onto the aiming scope sight picture 70, however in other embodiments the foregoing information is presented on a separate display that is in optical alignment with (e.g., rearward of) the aiming scope sight picture 70. As alternatively shown in FIG. 6, the touch screen interface 30 can display the identifying information pertaining to the person-of-interest, including an identity and a match confidence level. The touch screen interface 30 can also display an existing photograph 74 of the person-of-interest, for example a watchlist or booking photo of the person-of-interest. Where two or more persons-of-interest are identified, the touch screen interface 30 can including identifying information 68, 68' and an available photograph 74, 74' for each such person-of-interest. System parameters are also presented on the touch screen interface, including for example the current frame rate and the remaining battery life.

Figure 7:
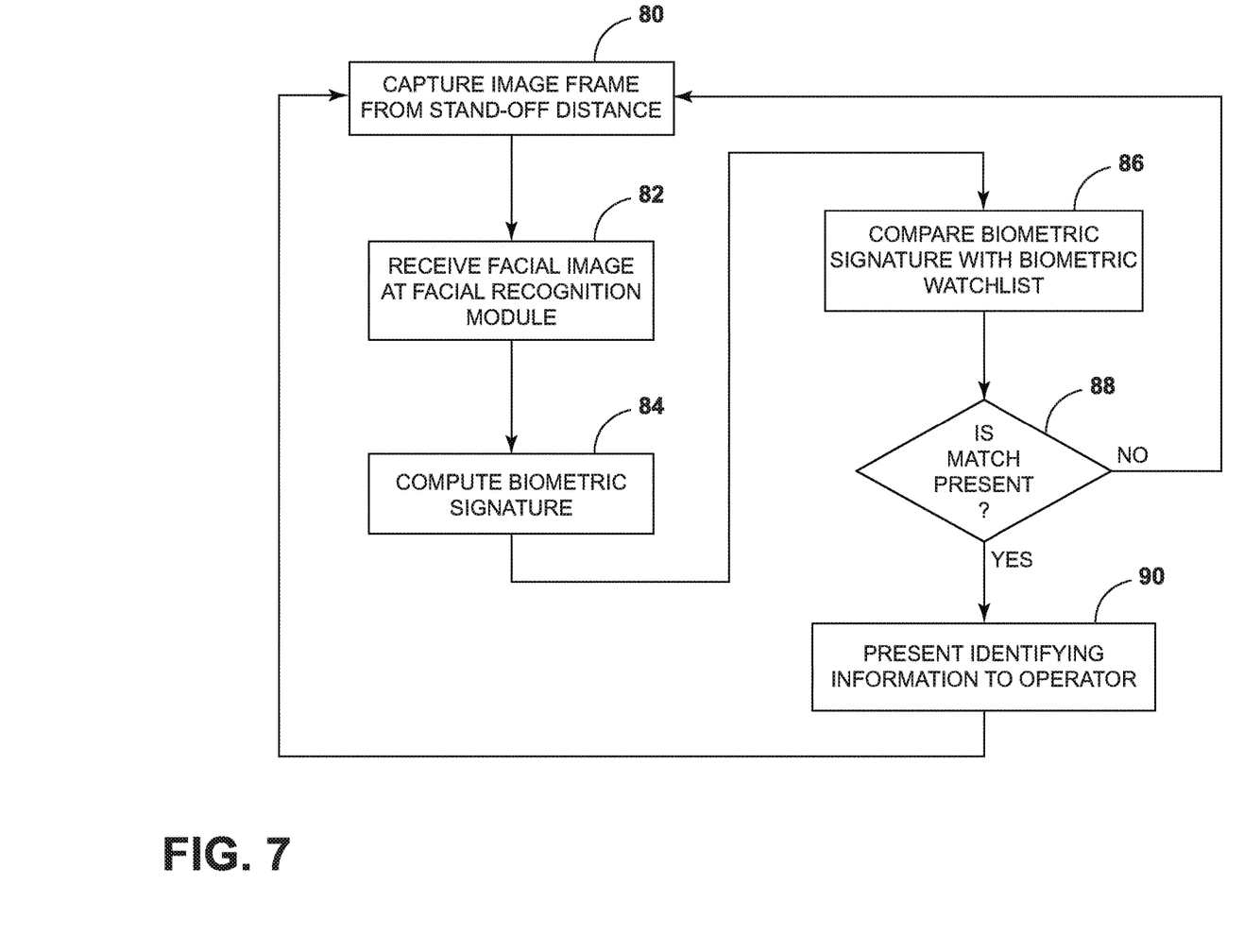
FIG. 7 is a flow-chart illustrating a method of operating the long-range facial recognition system of FIGS. 1 and 3.

Referring now to FIG. 7, a flow-chart depicting a method of performing facial recognition is illustrated. The method includes capturing one or more image frames of a person-of-interest from a stand-off distance at step 80 using the long-focus lens 14 and the machine-vision camera 12 described above. This step is in response to a user actuation of one or more control switches 25 on the hand grip 24. The method optionally includes performing auto-focus of the long-focus lens when imaging a human subject from a standoff distance. At step 82, the image frame data is output to the facial recognition module 16 for detection, extraction, and matching. In particular, the facial recognition module 16 segments face areas from within each image frame and determines a biometric signature for the person-of-interest at step 84. This step optionally includes performing atmospheric correction of the image frame data. At step 86, the facial recognition module 16 compares the biometric signature against known signatures on a biometric watchlist. The biometric watchlist is optionally stored to computer readable memory at the facial recognition system 10, allowing stand-alone functionality in environments where a network connection is unavailable. At decision step 88, the facial recognition module 16 determines if the captured biometric signature matches a known biometric signature with a predetermined confidence level. If a match is met, identifying information is presented to the operator at step 90. The identifying information can include a name and an existing photograph of the person-of-interest. This information can be superimposed on the aiming scope 18, presented on a heads-up-display in optical alignment with the aiming scope 18, and/or presented on the touch screen interface 30. If however a match is not met (at a given confidence level) at decision step 82, the method reverts to step 80 for the processing of image frames from the machine-vision camera 12. Further optionally, the captured biometric signature and the collected image/video data can be stored to onboard memory for later analysis or uploaded to other biometric systems for later analysis, optionally over a wireless network connection. The stored or uploaded image/video data can include additional information of interest, specific to the end-user application, including license plates and troop movements, for example.

The foregoing facial recognition system and method provide a rugged, intuitive rifle-like platform for long-distance facial recognition in real-time. The rifle-like platform of the present invention leverages existing surveillance techniques familiar to designated marksmen, spotters, and snipers and makes long-range collection more agile than with existing platforms. During preliminary evaluations, the facial recognition system of the present invention was able to perform facial recognition at 400 m under harsh conditions (e.g., strong atmospheric distortions) and 1.2 km under ideal environmental conditions. The rifle-like platform also allows for reconfigurable components, including interchangeable long-focus lenses, cameras, and facial recognition software. Additional software modules can include auto-focus software and atmospheric correction software to aid in quick collection and extended detection.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A long-range facial recognition system comprising:
a portable mounting platform including an elongated frame having upper and lower mounting rails, a hand grip, a shoulder stock, and an underbody support attachment;
a machine-vision camera optically coupled to a long-focus lens, the machine-vision camera and the long-focus lens being mounted to the elongated frame;
a facial recognition module mounted to the elongated frame and including computer readable memory with instructions that, when executed, cause the facial recognition module to identify an individual within an image frame captured by the machine-vision camera; and
an aiming scope mounted to the upper mounting rail of the elongated frame, the aiming scope having an overlapping field of view with the machine-vision camera.

2. The system of claim 1 wherein the aiming scope is adapted to display identifying information pertaining to the individual identified by the facial recognition module.

3. The system of claim 1 further including a touch screen interface mounted to the upper mounting rail.

4. The system of claim 3 wherein the touch screen interface is adapted to display identifying information pertaining to a plurality of individuals identified by the facial recognition module.

5. The system of claim 1 wherein the hand grip interconnects the upper and lower mounting rails and is laterally offset from an optical axis of the long-focus lens.

6. The system of claim 1 wherein the upper and lower mounting rails extend parallel to each other and are interconnected by a plurality of vertical spacers.

7. The system of claim 1 further including a bipod, a tripod, or a monopod coupled to the underbody support attachment of the portable mounting platform.

8. The system of claim 1 wherein the facial recognition module is housed within an electronics bracket coupled to the upper and lower mounting rails rearward of the hand grip.

9. The system of claim 1 further including first and second ring clamps extending at least partially around the long-focus lens for securing the long-focus lens to the lower mounting rail.

10. The system of claim 1 wherein the shoulder stock includes an adjustable length and is secured to the upper mounting rail.

11. A method for long-range facial recognition, the method comprising:
providing a portable facial recognition system including a long-focus lens, a machine-vision camera, and a facial recognition module each being mounted to a portable mounting platform having an upper mounting rail spaced apart from a lower mounting rail, the portable mounting platform further including an aiming scope, a hand grip, a shoulder stock;

receiving, from the machine-vision camera, an image frame including a two-dimensional facial image at the facial recognition module;

computing, at the facial recognition module, a biometric signature based on at least a portion of the two-dimensional facial image;

comparing, at the facial recognition module, the computed biometric signature with a plurality of known biometric signatures to determine a match; and if a match is determined, displaying identifying information relating to the match to a user of the portable facial recognition system.

12. The method of claim 11 wherein receiving an image frame at the facial recognition module is in response to actuation of a control switch for activating the machine-vision camera.

13. The method of claim 11 wherein the identifying information is visible through the aiming scope.

14. The method of claim 11 further including superimposing a designator graphic onto a face that is viewable through the aiming scope.

15. The method of claim 11 further including a touch screen interface mounted to the upper mounting rail, wherein the identifying information is displayed on the touch screen interface.

16. The method of claim 11 wherein computing a biometric signature includes segmenting one or more face areas from an image background within the image frame.

17. The method of claim 11 wherein the plurality of known biometric signatures comprises a biometric watchlist stored to computer readable memory.

18. The method of claim 11 further including pixel binning the image frame received from the machine-vision camera to increase a signal-to-noise ratio thereof.

19. The method of claim 11 further including performing auto-focus of the long-focus lens when imaging a human subject from a standoff distance.

20. The method of claim 11 further including performing atmospheric correction of the image frame when imaging a human subject from a standoff distance.

* * * * *